(12) United States Patent
Castaing et al.

(10) Patent No.: US 10,076,973 B2
(45) Date of Patent: Sep. 18, 2018

(54) SEAT UNIT WITH AN ADVERTISING SURFACE

(71) Applicant: Zodiac Seats France, Issoudun (FR)

(72) Inventors: Nathalie Castaing, Issoudun (FR); Charles Ehrmann, Issoudun (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 15/302,612

(22) PCT Filed: Apr. 13, 2015

(86) PCT No.: PCT/IB2015/052681
§ 371 (c)(1),
(2) Date: Oct. 7, 2016

(87) PCT Pub. No.: WO2015/155751
PCT Pub. Date: Oct. 15, 2015

(65) Prior Publication Data
US 2017/0028874 A1    Feb. 2, 2017

Related U.S. Application Data

(60) Provisional application No. 61/978,435, filed on Apr. 11, 2014.

(51) Int. Cl.
*B60N 2/01* (2006.01)
*B60N 2/22* (2006.01)
(Continued)

(52) U.S. Cl.
CPC ............... *B60N 2/01* (2013.01); *B60N 2/22* (2013.01); *B60N 2/42* (2013.01); *B64D 11/06* (2013.01);
(Continued)

(58) Field of Classification Search
CPC . B60N 2/01; B60N 2/242; B60N 2/22; B64D 11/06; B64D 11/0619;
(Continued)

(56) References Cited

U.S. PATENT DOCUMENTS 2,711,786 A      6/1955  Weiss
3,910,632 A  *  10/1975  Marechal ............... A47C 1/124
                                          244/118.6
(Continued)

FOREIGN PATENT DOCUMENTS

| EP | 0716980 | | 6/1996 |
| FR | 2677791 | | 12/1992 |
| KR | 2010096379 | A * | 9/2010 |
| WO | 2008072328 | | 6/2008 |
| WO | 2015155751 | | 10/2015 |

OTHER PUBLICATIONS

International Patent Application No. PCT/IB2015/052681, Search Report and Written Opinion dated Jul. 29, 2015.

*Primary Examiner* — Milton Nelson, Jr.
(74) *Attorney, Agent, or Firm* — Kilpatrick Townsend & Stockton LLP; Dean W. Russell; Davidson G. Lucas

(57) ABSTRACT

Described are seat units with a plurality of passenger seats. In these seat units, each seat has a seat back and a seat pan, and each seat back has an upper portion and a lower portion. The lower portions of the seat backs are integrally formed together as a single lower panel.

15 Claims, 10 Drawing Sheets

(51) Int. Cl.
*B60N 2/42* (2006.01)
*B64D 11/06* (2006.01)
*G09F 23/00* (2006.01)

(52) U.S. Cl.
CPC ...... *B64D 11/0619* (2014.12); *B64D 11/0639* (2014.12); *G09F 2023/005* (2013.01); *Y02T 50/46* (2013.01)

(58) Field of Classification Search
CPC . B64D 11/0639; B64D 11/0638; A47C 7/405; G09F 2023/005
USPC .................. 297/452.14, 248, 216.13, 354.11
See application file for complete search history.

(56) References Cited

U.S. PATENT DOCUMENTS

| | | | |
|---|---|---|---|
| 4,936,620 A * | 6/1990 | Francois | B64D 11/00 105/345 |
| 5,464,273 A * | 11/1995 | Makoto | B60N 2/242 297/232 |
| 5,692,705 A | 12/1997 | Bellais | |
| 2001/0030455 A1* | 10/2001 | Craft | B60N 2/242 297/248 |
| 2006/0163917 A1* | 7/2006 | Schroeder | B64D 11/06 297/188.1 |
| 2008/0290715 A1 | 11/2008 | Fullerton et al. | |
| 2009/0102256 A1* | 4/2009 | Staab | B64D 11/06 297/216.13 |

* cited by examiner

SEAT UNIT WITH AN ADVERTISING SURFACE

CROSS REFERENCE TO RELATED APPLICATIONS

This application is the U.S. national phase entry of International Patent Application Serial No. PCT/IB2015/052681 ("the '681 application"), filed on Apr. 13, 2015, which application is related to and claims priority benefits from U.S. Provisional Application Ser. No. 61/978,435 ("the '435 application"), filed on Apr. 11, 2014, entitled High Density Economy Class Seat. The '681 and '435 applications are hereby incorporated in their entireties by this reference.

FIELD OF THE INVENTION

The invention relates to seat units for vehicle cabins, particular seat units comprising multiple passenger seats.

BACKGROUND

Common carriers, such as passenger airlines, bus lines, and train lines, frequently convey substantial numbers of passengers simultaneously. In many instances, there is a desire to increase the number of seats within a given space to optimize the number of passengers being transported at any given time, such as in economy class seating in aircraft as an example.

By increasing the number of passenger seats in the space, the amount of space available between seats arranged in a column (also known as pitch) is diminished. For example, a desirable pitch may be a small as 27 inches or less. Typically, the amount by which pitch can be reduced is usually constrained by the dimension of the passenger seat that is in the area of a passenger's knees located behind a seat back of the passenger seat.

In conventional economy seating, the passenger seats typically provide some amount of recline adjustment for the seat back. The reclining function requires additional pitch to allow the seat back to recline without impacting the passenger's knees. In some economy seating arrangements, the pitch has been somewhat reduced by eliminating the recline function altogether or at least reconfiguring the seat back so that only the portion of the seat back above the knee area reclined. However, even with these changes, additional pitch reduction is desired for certain applications.

Another factor that influences the amount by which pitch may be reduced is related to safety regulations designed to minimize injuries during a crash. For example, due to the small pitch between two rows of seats, passengers seated in the second row of seats will typically impact the seat backs of the seats in the first row during a crash. For aircraft passenger seats, current safety regulations require performance of various crash tests with two rows of seats spaced apart at the targeted pitch, while dummies are positioned in the second row of seats. In these crash tests, the so-called Head Injury Criterion ("HIC") has to remain at or below a value of 1000.

Conventionally, energy dissipation solutions focused on allowing the passenger seatback to pivot forward in a controlled manner via features located in the lower back area of the passenger seatback that give way under a certain load. Generally, these features include metallic brackets with a designed shear area or shear bolts that are attached to the back diaphragm of the seat. For example, these seats rely on mechanical fuse parts or other energy absorbing devices to absorb the crash impact force to achieve an acceptable HIC value.

Components of these seats typically include vertical legs attached to the seat track of the aircraft, one or more transverse beams, spreaders between each individual seat to which the seat belt is attached, seat pans, seat backs (fixed or reclinable), and other features, such as armrests, tray tables, etc.

Thus, it may be desirable to provide a seat with lighter weight and thinner components to provide additional reductions in pitch and weight, while also providing an acceptable HIC value.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat unit comprises a plurality of passenger seats, each seat comprising a seat back and a seat pan, each seat back comprising an upper portion and a lower portion, wherein the lower portions of the seat backs are integrally formed together as a single lower panel.

In some embodiments, the upper portions of the seat backs are pivotally attached to the single lower panel and are configured to recline relative to the single lower panel.

In other embodiments, the upper portions of the seat backs are integrally formed together with the single lower panel as a single monolithic structure. In additional embodiments, the seat pans may be integrally formed together with the single lower panel as a single monolithic structure. In further embodiments, the upper portions of the seat backs and the seat pans are integrally formed together with the single lower panel as a single monolithic structure.

In some embodiments, the seat backs are configured to absorb a force due to an impact by a head of a passenger seated behind the seat back, and to limit a Head Injury Criteria to an acceptable level of 1000 or less.

In certain embodiments, the single lower panel comprises at least one surface that comprises an advertising banner or decoration.

According to some embodiments, a gap is formed between adjacent upper portions of the seat backs. The gap may be approximately 1-4 inches.

In certain cases, the single lower panel is free of accessories that occupy space between the single lower panel and a passenger's knees.

According to certain embodiments of the present invention, a plurality of seat units as described above comprise a pitch between the seat units that is less than 36 inches.

BRIEF DESCRIPTION OF THE DRAWINGS

In the following detailed description, embodiments of the invention are described referring to the following figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of seat units may be described with reference to an aircraft cabin, they are by no means so limited. In fact, the seat units may be used in conjunction with any type of vehicle cabin or otherwise as desired.

Figure 5:
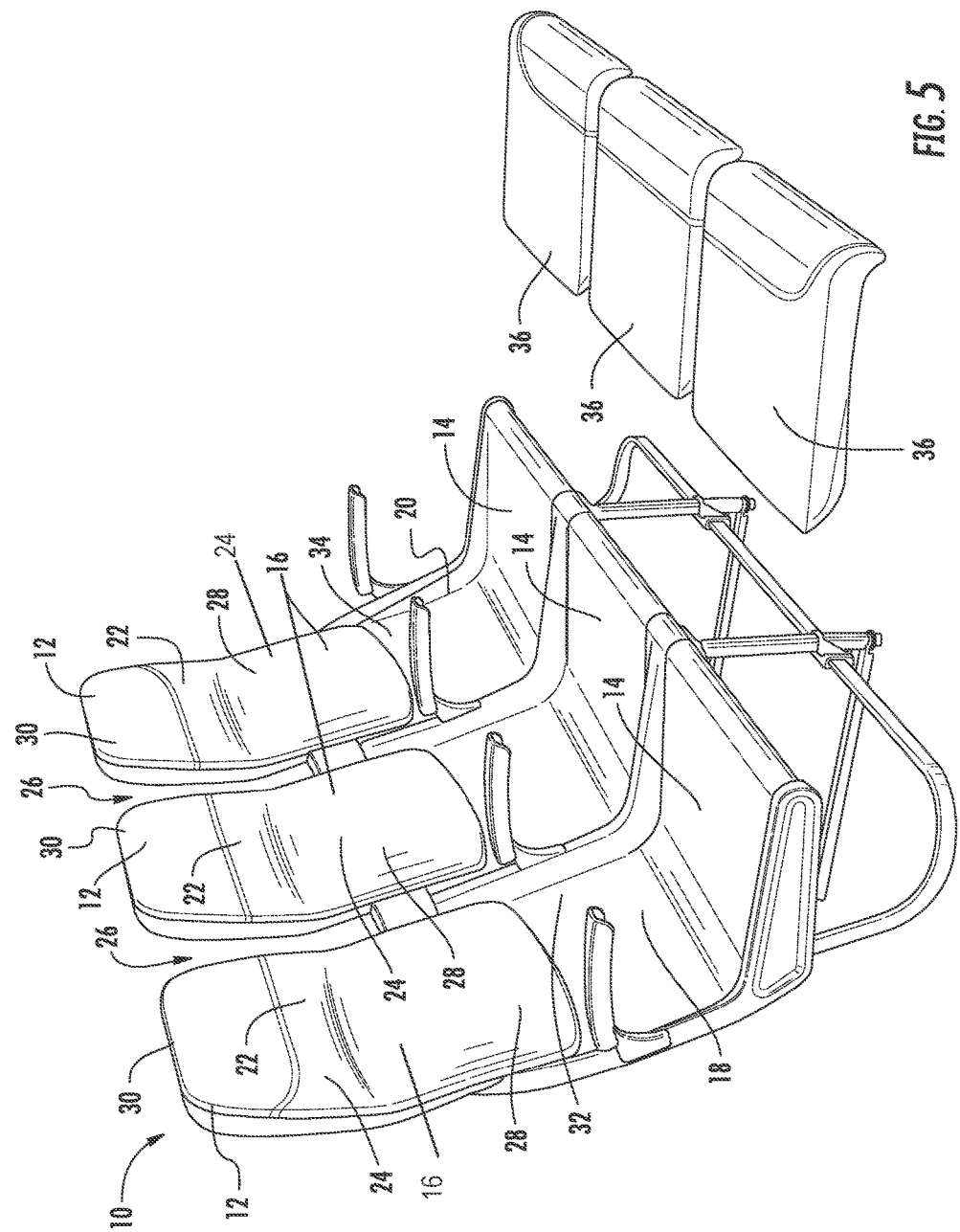
FIG. 5 is a front perspective view of a seat unit with the seat back and seat pan formed as a monolithic structure, according to certain embodiments of the present invention.
Figure 6:
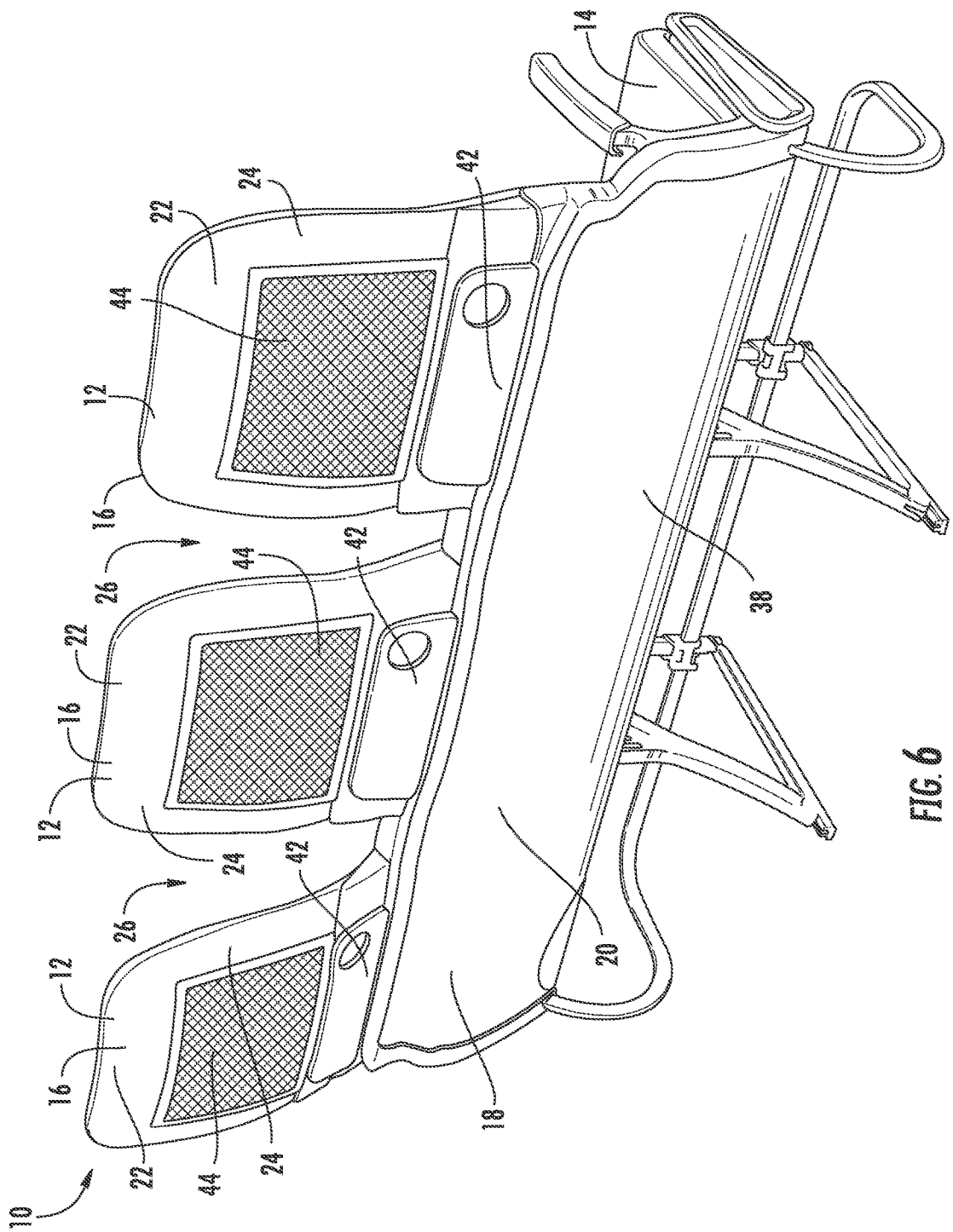
FIG. 6 is a rear perspective view of a seat unit with upper portions of seat backs pivotally coupled to a single lower panel, according to certain embodiments of the present invention.
Figure 7:
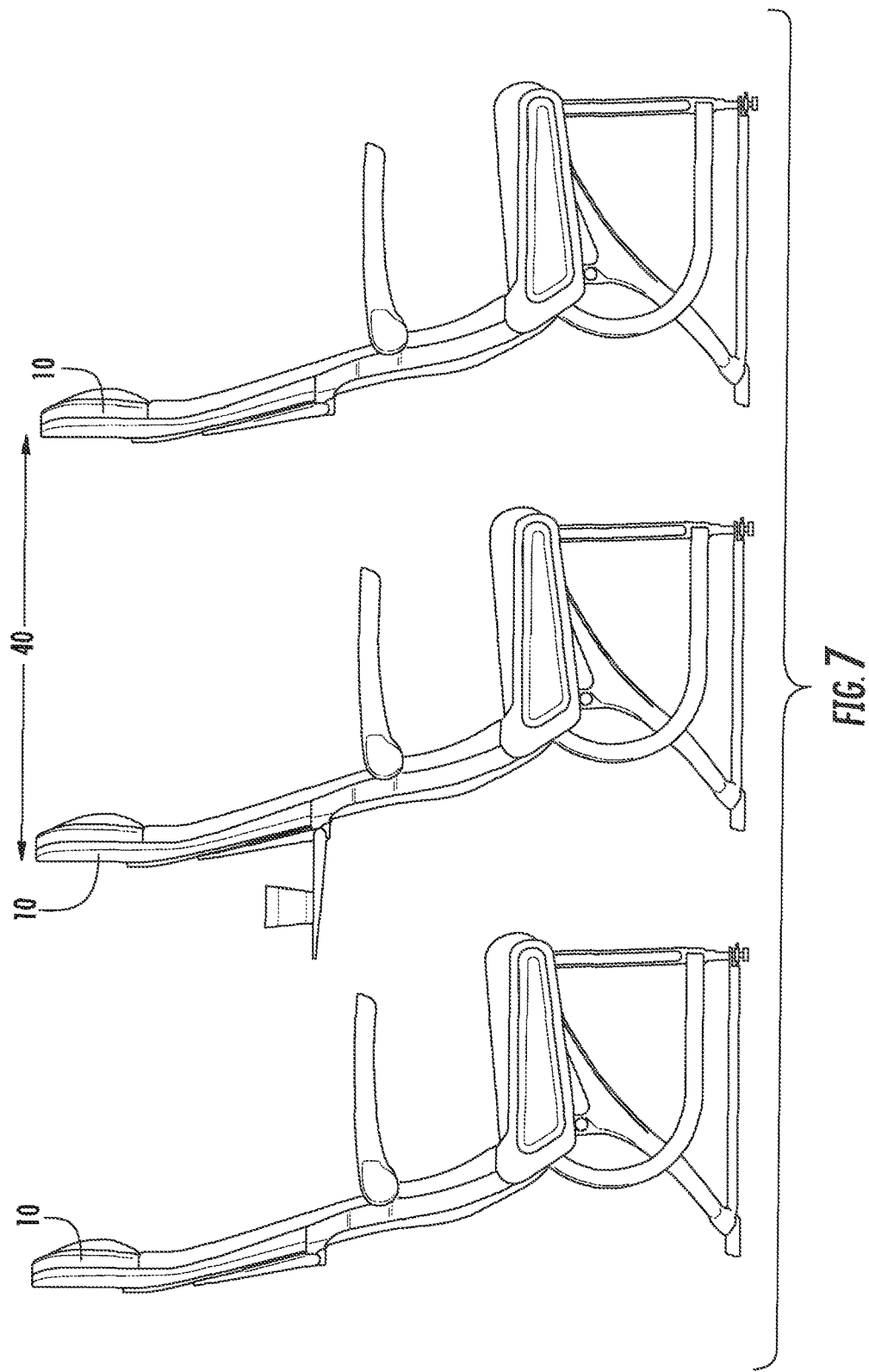
FIG. 7 is a side view of a plurality of seat units arranged in a column, according to certain embodiments of the present invention.
Figure 8:
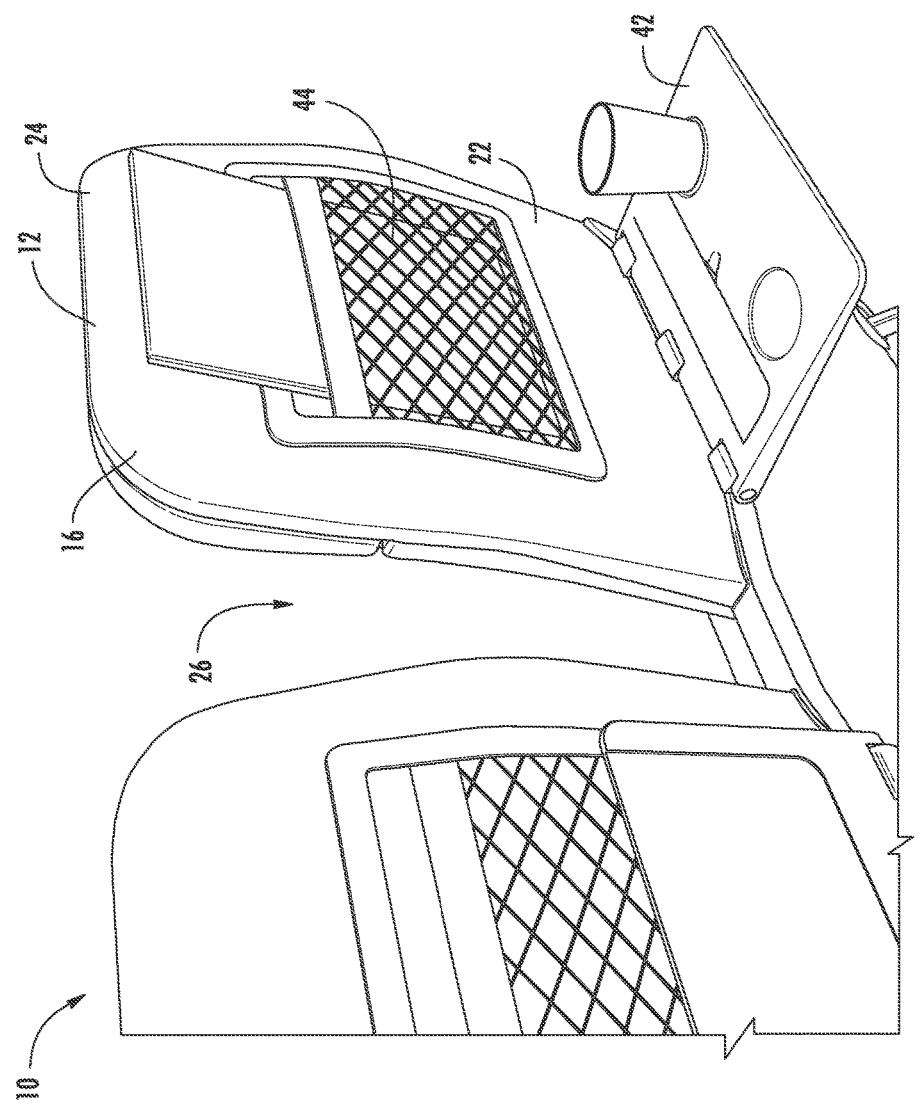
FIG. 8 is a rear perspective view showing accessories coupled to an upper portion of seat backs of a seat unit, according to certain embodiments of the present invention.

In certain embodiments of the present invention, as illustrated in FIGS. 1-10, a seat unit 10 comprises a plurality of passenger seats 12. Each passenger seat 12 comprises a seat pan 14 and a seat back 16. A lower panel 18 may be used to form a lower portion 20 of the seat back 16 for each of the passenger seats 12 within the seat unit 10. The lower panel 18 may be integrally formed as a single piece. The lower panel 18 may be formed of composites, plastic, or metallic materials, or other suitable materials that provide the desired deformation properties, and which allow the lower panel 18 to be formed as thin as possible. The use of a thin, integrally formed lower panel 18 provides a reduction in a pitch 40 between a plurality of seat units 10 arranged in a column by approximately 1 inch without changing the amount of space available for a passenger's knees between seats, as best illustrated in FIG. 7. In certain embodiments, the pitch 40 may be less than 36 inches (in, for example, exit rows and the like), and may further be less than 34 inches. Furthermore, to ensure that the pitch 40 is as small as possible, the lower panel 18 may be free of any accessories that occupy space between the lower panel 18 and a passenger's knees, such as tray tables 42, literature pockets 44, other niches, and the like, as best illustrated in FIGS. 1, 6, and 8-9.

An upper panel 22 may be attached to the lower panel 18 to form an upper portion 24 of the seat back 16 for each passenger seat 12 in the seat unit 10. These upper panels 22 may be separately formed from the lower panel 18. The upper panels 22 may comprise a cumulative lateral dimension that is smaller than the lateral dimension of the lower panel 18. As a result, when each upper panel 22 is connected to the lower panel 18, a gap 26 is formed between adjacent upper panels 22 to provide for some separation between passengers seated in adjacent seats 12. The gap 26 may be as wide as approximately 1 inch or more, for example, to accommodate an armrest in its lifted position, and may further range from 1-4 inches.

Figure 4:
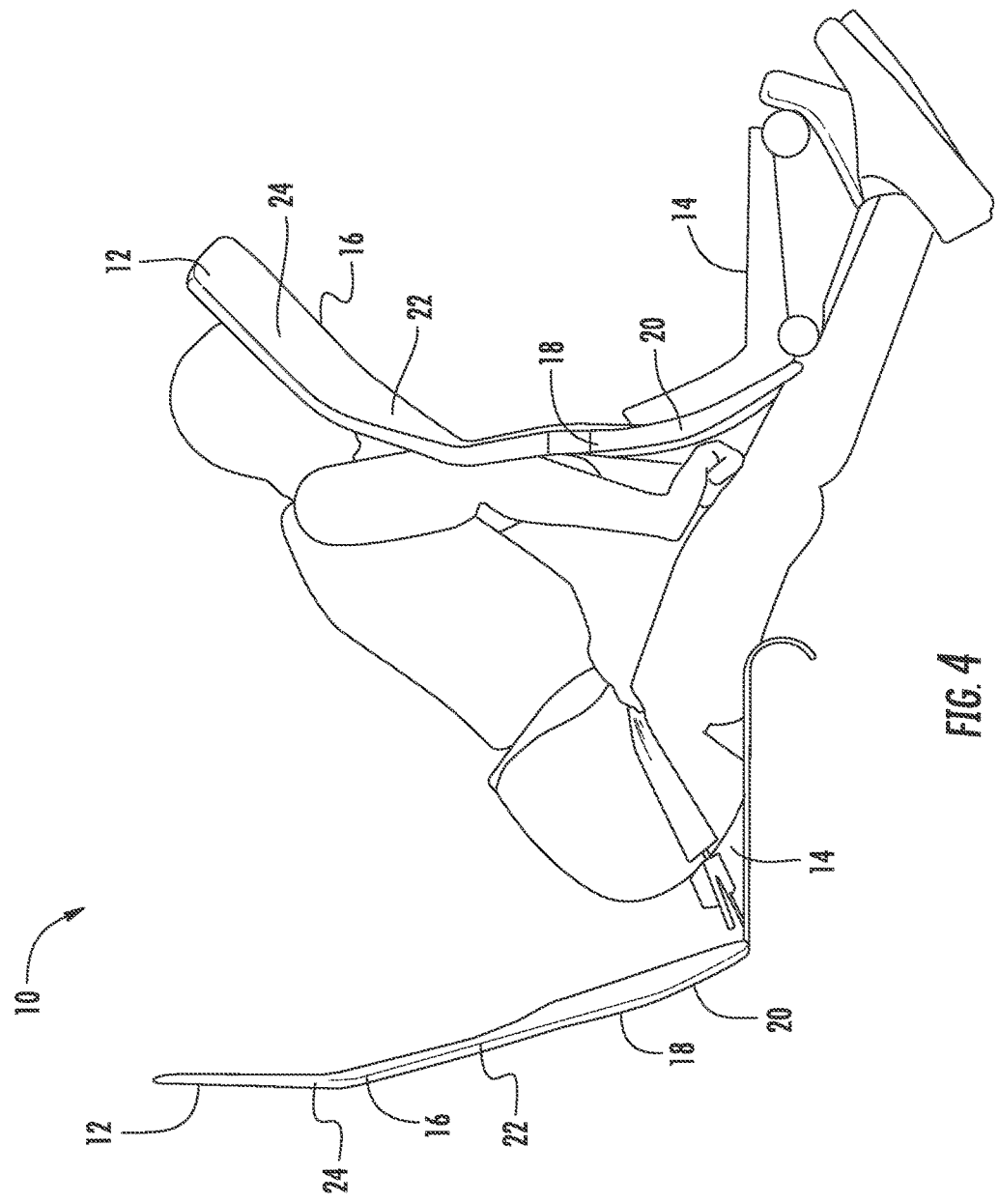
FIG. 4 is a side view illustrating a deformation of the seat backs of the seat unit of FIG. 1 in the event of a crash.

In these embodiments, as best illustrated in FIG. 4, the seat unit 10 is configured to absorb a force due to an impact by a head of a passenger seated behind the seat back, and to limit a Head Injury Criteria to an acceptable level of 1000 or less through deformation of the seat back structure, rather than through the use of mechanical fuse parts or other energy absorbing devices. Specifically, the passenger kinetic energy is absorbed in crash conditions by deformation of the backrest structure, primarily at the junction between the lower panel 18 and the individual upper panels 22.

Figure 1:
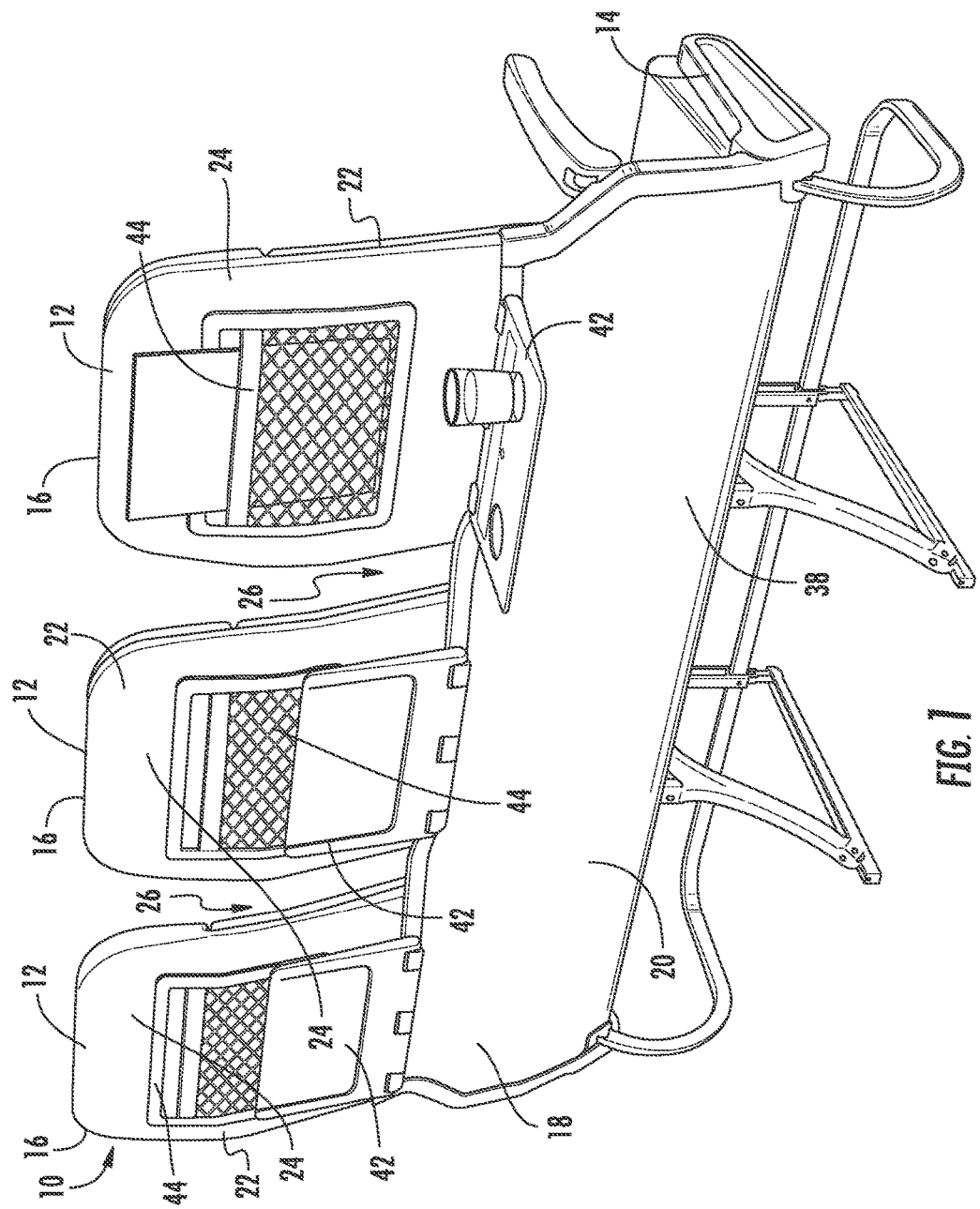
FIG. 1 is a rear perspective view of a seat unit, according to certain embodiments of the present invention.
Figure 2:
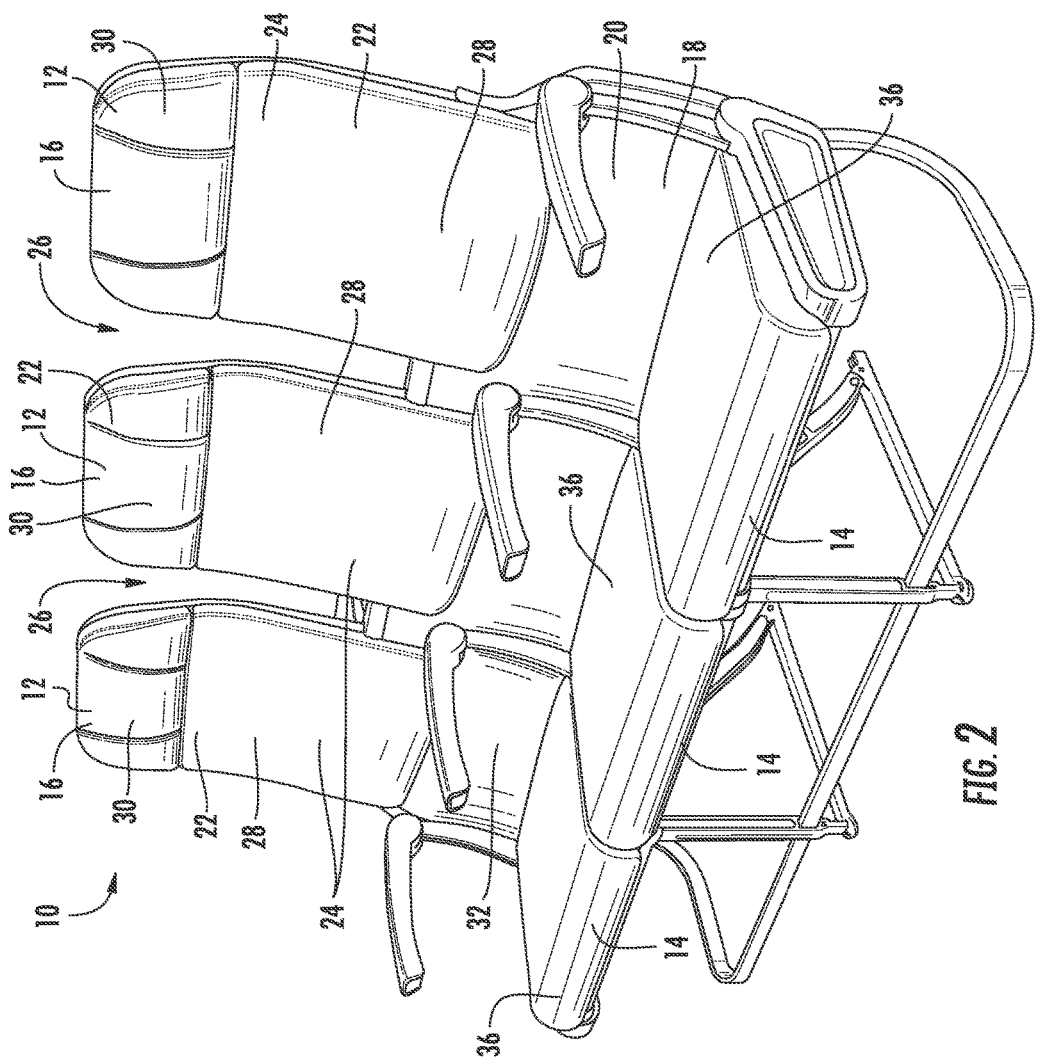
FIG. 2 is a front perspective view of the seat unit of FIG. 1.
Figure 10:
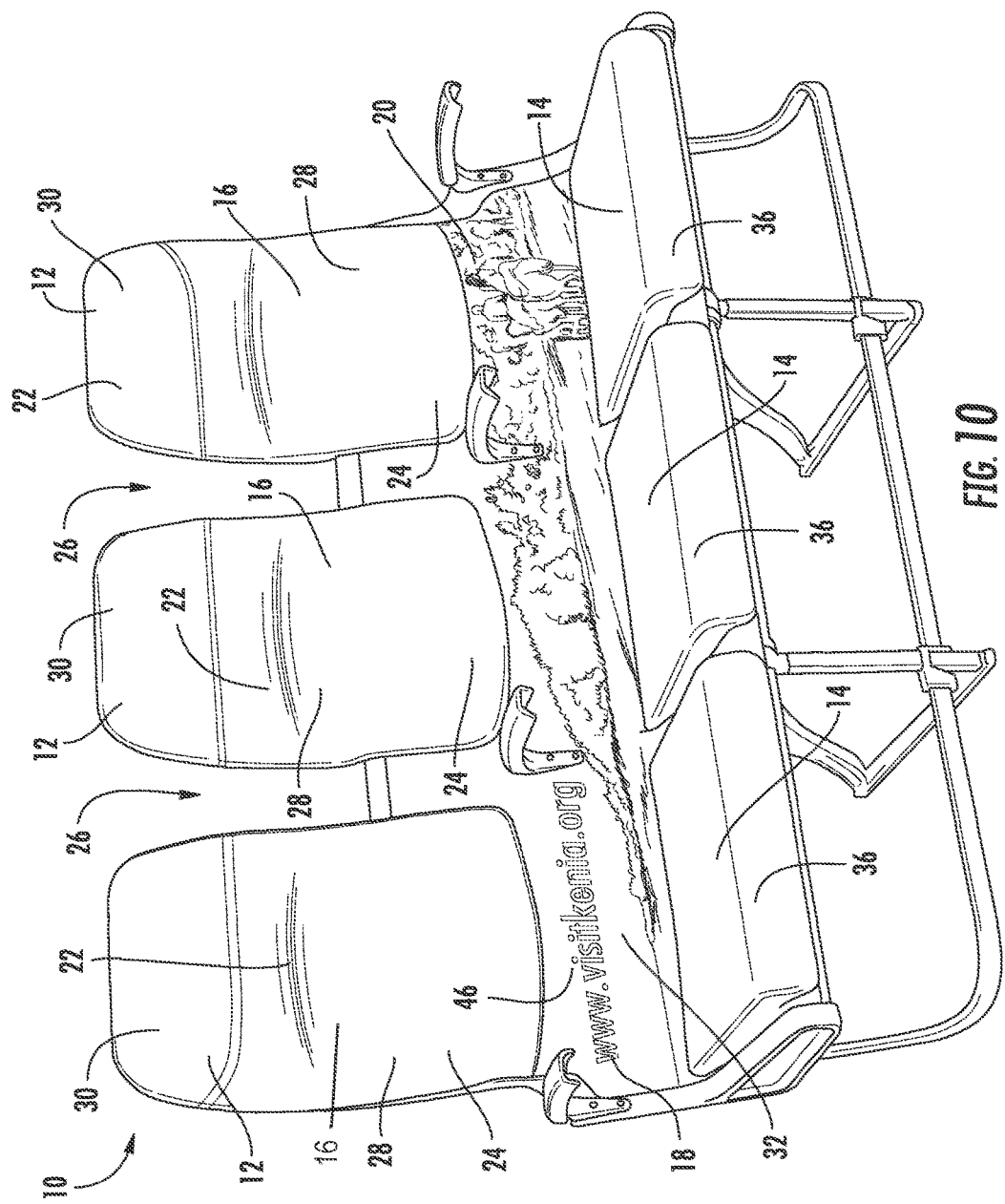
FIG. 10 is a front perspective view of a seat unit comprising an advertising banner on a front surface of a single lower panel, according to certain embodiments of the present invention.

In certain embodiments, as best illustrated in FIGS. 2, 5, and 10, the upper panels 22 may be configured with seat back cushions 28 and/or headrests 30 to support a passenger's upper back, head, and/or neck. To optimize the living space, the lower panel 18 may be configured without an additional cover or other cushioning on a front surface 32, as best illustrated in FIGS. 2, 5, and 10.

In certain embodiments, as shown in FIG. 6, each upper panel 22 may be pivotally coupled to the lower panel 18 and provided with a recline lock mechanism that allows the upper panel 22 to recline relative to the lower panel 18. Because the upper panel 22 is configured to be positioned above a passenger's knees, the recline mechanism does not require additional space or pitch between seats to avoid impacting the passenger's knees.

Figure 3:
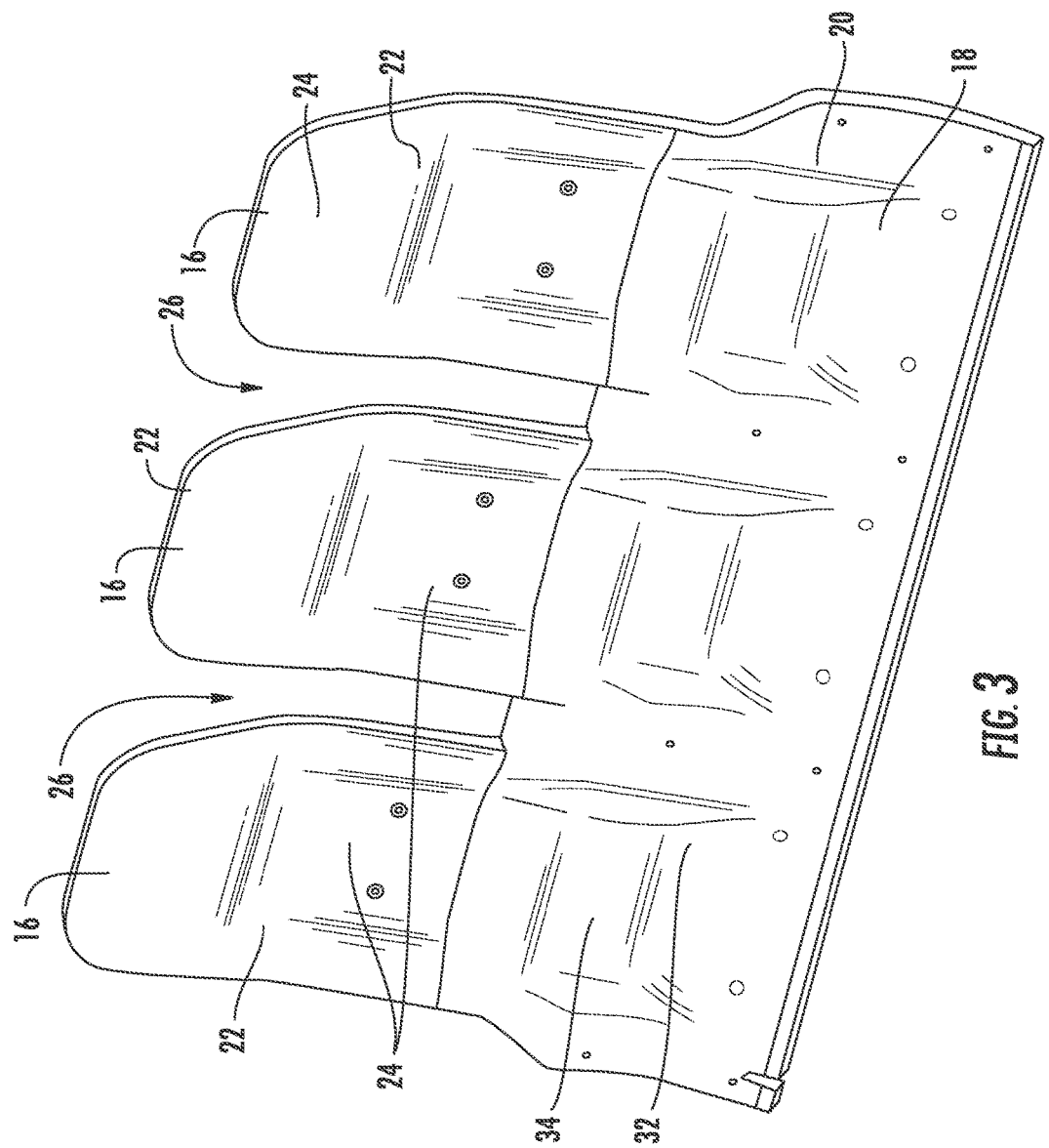
FIG. 3 is a partial view of seat backs of the seat unit of FIG. 1 comprising a plurality of upper panels and a single lower panel.

In yet other embodiments, as shown in FIGS. 3 and 5, the monolithic design of the lower panel 18 may be extended to include the support structure of the seat pan 14 and/or the support structure of the upper panels 22 as a monolithic structure 34. In other words, the seat back 16 and the seat pan 14 for all seats 12 in the seat unit 10 may be formed as an integrally formed, single piece 34. In certain embodiments, seat back cushions 28, headrests 30, and/or seat pan cushions 36 may be attached to the monolithic structure 34. In these embodiments, the lower panel 18, the seat pan 14, and/or the support structure of the upper panels 22 may be formed of composites, plastic, or metallic materials, or other suitable materials that provide the desired deformation properties.

Figure 9:
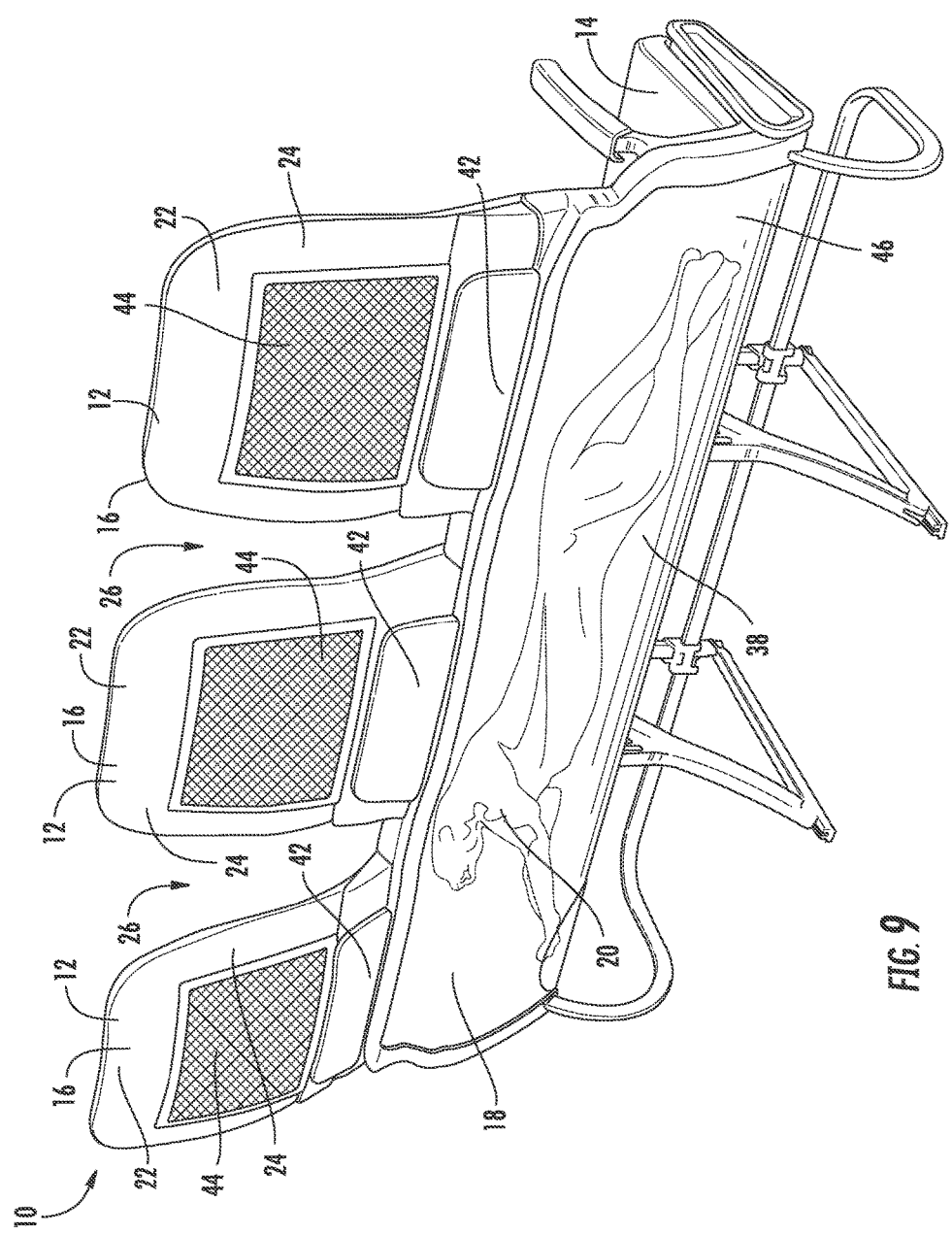
FIG. 9 is a rear perspective view of a seat unit comprising an advertising banner on a rear surface of a single lower panel, according to certain embodiments of the present invention.

Furthermore, as shown in FIGS. 9-10, because at least the lower panel 18 is formed as a single integrally formed surface, the lower panel 18 may be utilized for larger advertising banners 46 or decorations on the front surface 32, a rear surface 38, or both.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat unit comprising:
   a plurality of passenger seats, each passenger seat comprising a seat back and a seat pan, each seat back comprising an upper portion and a lower portion, wherein:
   each upper portion of the seat back of each passenger seat is separate from other upper portion(s) such that each passenger seat comprises an individual upper panel;
   there is a gap in a lateral direction of the seat unit between upper panels of adjacent passenger seats, wherein the gap extends a full depth in a forward/rear direction of the seat unit; and
   the lower portions of the seat backs are integrally formed together as a single lower panel.

2. The seat unit of claim 1, wherein the gap extends continuously in a vertical direction of the seat unit between an upper edge of the single lower panel and an upper edge of the seat unit.

3. The seat unit of claim 1, wherein the upper portions of the seat backs are integrally formed together with the single lower panel as a single monolithic structure.

4. The seat unit of claim 1, wherein the seat pans are integrally formed together with the single lower panel as a single monolithic structure.

5. The seat unit of claim 1, wherein the upper portions of the seat backs and the seat pans are integrally formed together with the single lower panel as a single monolithic structure.

6. The seat unit of claim 1, wherein the seat backs are configured to absorb a force due to an impact by a head of a passenger seated behind the seat back, and to limit a Head Injury Criteria to an acceptable level of 1000 or less.

7. The seat unit of claim 1, wherein the single lower panel comprises at least one surface that comprises an advertising banner or decoration.

8. The seat unit of claim 1, wherein the single lower panel comprises a continuous rear surface on a rear side of the seat unit such that the continuous rear surface extends a full lateral width of the seat unit.

9. The seat unit of claim 1, wherein the gap is approximately 1-4 inches in the lateral direction.

10. The seat unit of claim 1, wherein the single lower panel is free of accessories that occupy space between the single lower panel and a passenger's knees.

11. A plurality of seat units of claim 1 arranged in a column, wherein a pitch in the forward/rear direction between the seat units is less than 34 inches.

12. The seat unit of claim 1, wherein a transition between the single lower panel and the individual upper panels is disposed at a lower surface of a tray table.

13. The seat unit of claim 1, wherein a transition between the single lower panel and the individual upper panels is disposed approximately halfway between the seat pan and a headrest of each passenger seat.

14. The seat unit of claim 1, wherein the individual upper panels of the seat backs are pivotally attached to the single lower panel and are configured to recline relative to the single lower panel.

15. The seat unit of claim 14, wherein the pivotal attachment between the individual upper panels of the seat backs and the single lower panel comprises a pivot axis adjacent to a top of the single lower panel.

\* \* \* \* \*